(12) United States Patent
Mateo et al.

(10) Patent No.: US 9,184,854 B2
(45) Date of Patent: Nov. 10, 2015

(54) INTER-BAND CROSS-PHASE MODULATION COMPENSATION FOR THE MITIGATION OF INTRA-CHANNEL NONLINEAR IMPAIRMENTS IN OPTICAL FIBER TRANSMISSION

(71) Applicant: NEC Laboratories America, Inc., Princeton, NJ (US)

(72) Inventors: Eduardo F. Mateo, Princeton, NJ (US); Fatih Yaman, Monmouth Junction, NJ (US); Dayou Qian, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 204 days.

(21) Appl. No.: 14/044,518

(22) Filed: Oct. 2, 2013

(65) Prior Publication Data

US 2014/0099128 A1 Apr. 10, 2014

Related U.S. Application Data

(60) Provisional application No. 61/711,297, filed on Oct. 9, 2012.

(51) Int. Cl.
*H04B 10/06* (2006.01)
*H04B 10/61* (2013.01)

(52) U.S. Cl.
CPC .................. *H04B 10/6163* (2013.01)

(58) Field of Classification Search
CPC .................................................. H04B 10/6163
USPC .................................................. 398/202–214
See application file for complete search history.

(56) References Cited

U.S. PATENT DOCUMENTS

| | | | |
|---|---|---|---|
| 7,684,712 B1* | 3/2010 | Roberts et al. | 398/208 |
| 8,521,040 B2* | 8/2013 | Youn | H04B 10/6971 398/208 |
| 2009/0190929 A1* | 7/2009 | Khurgin | H04B 10/61 398/79 |
| 2009/0214215 A1* | 8/2009 | Li et al. | 398/81 |
| 2009/0324224 A1* | 12/2009 | Xie | 398/65 |
| 2010/0014873 A1* | 1/2010 | Bulow | 398/159 |
| 2010/0046961 A1* | 2/2010 | Tanimura et al. | 398/159 |
| 2010/0239261 A1* | 9/2010 | Li | H04B 10/2507 398/81 |
| 2010/0239262 A1* | 9/2010 | Li et al. | 398/81 |
| 2010/0247099 A1* | 9/2010 | Lowery et al. | 398/79 |
| 2011/0255879 A1* | 10/2011 | Xie et al. | 398/208 |
| 2011/0286741 A1* | 11/2011 | Yan | H04B 10/60 398/34 |
| 2012/0026860 A1* | 2/2012 | Yan et al. | 370/201 |
| 2012/0082468 A1* | 4/2012 | Qian et al. | 398/188 |
| 2012/0170929 A1* | 7/2012 | Xie | H04B 10/07951 398/33 |
| 2012/0290244 A1* | 11/2012 | Yan | H04B 10/6971 702/86 |
| 2012/0301146 A1* | 11/2012 | Mateo | H04B 10/6163 398/65 |

(Continued)

*Primary Examiner* — Ken Vanderpuye
*Assistant Examiner* — Dibson Sanchez
(74) *Attorney, Agent, or Firm* — Joseph Kolodka (57) ABSTRACT

An optical communication system includes a digital signal processer coupled to the coherent receiver, said coherent receiver including a nonlinearity compensation module for compensating for nonlinear effects in fiber in the optical link for increasing capacity or transmission distance of the fiber, the nonlinearity compensation module includes a spectral slicing of the signal into bands, computing nonlinear interaction between the bands with parameters opposite to those of the fiber to reverse the non-linear effects in the fiber, and only certain nonlinear interactions between bands are considered thereby reducing complexity of the nonlinearity compensation.

12 Claims, 5 Drawing Sheets

(56) References Cited

U.S. PATENT DOCUMENTS

| | | | |
|---|---|---|---|
| 2012/0308233 A1* | 12/2012 | Hironishi et al. | 398/65 |
| 2012/0314824 A1* | 12/2012 | Fujimura | 375/350 |
| 2013/0230313 A1* | 9/2013 | Yan et al. | 398/25 |
| 2014/0286642 A1* | 9/2014 | Lowery | H04B 10/697 398/115 |

* cited by examiner

INTER-BAND CROSS-PHASE MODULATION COMPENSATION FOR THE MITIGATION OF INTRA-CHANNEL NONLINEAR IMPAIRMENTS IN OPTICAL FIBER TRANSMISSION

This application claims the benefit of U.S. Provisional Application No. 61/711,297, filed Oct. 9, 2012, entitled "Intra-Channel XPM Compensation for Single-Stage Backward-Propagation", of which the contents are incorporated herein by reference.

BACKGROUND OF THE INVENTION

The present invention relates generally to optical systems and, more particularly, to inter-band cross-phase modulation compensation for the mitigation of intra-channel nonlinear impairments in optical fiber transmission.

Although the following references, articles or publications are referred to in this specification., they are NOT considered relevant to the patentability of the claims herein. They are noted to provide complete information, regardless of their materiality to the claims. [1] Watanabe, S.; Shirasaki, M.; "Exact compensation for both chromatic dispersion and Kerr effect in a transmission fiber using optical phase conjugation," Lightwave Technology, Journal of, vol. 14, no. 3, pp. 243-248, Mar 1996. [2] Mateo, E. F.; Xiang Zhou; Guifang Li; , "Electronic phase conjugation for nonlinearity compensation in fiber communication systems," Optical Fiber Communication Conference and Exposition (OFC/NFOEC), 2011 and the National Fiber Optic Engineers Conference, vol., no., pp. 1-3, 6-10 Mar. 2011. [3] Ip, E. M.; Kahn, J. M.; , "Fiber Impairment Compensation Using Coherent Detection and Digital Signal Processing," Lightwave Technology, Journal of, vol. 28, no. 4, pp. 502-519, Feb. 15, 2010. [4] Lei Li; Zhenning Tao; Liang Dou; Weizhen Yan; Oda, S.; Tanimura, T.; Hoshida, T.; Rasmussen, J. C.; "Implementation efficient nonlinear equalizer based on correlated digital backpropagation," Optical Fiber Communication Conference and Exposition (OFC/NFOEC), 2011 and the National Fiber Optic Engineers Conference, vol., no., pp. 1-3, 6-10 Mar. 2011. [5] E. Mateo, M. Huang, F. Yaman, T. Wang, Y. Aono, and T. Tajima, "Nonlinearity compensation using very-low complexity backward propagation in dispersion managed links," in Optical Fiber Communication Conference, OSA Technical Digest (Optical Society of America, 2012), paper OTh3C.4. [6] NECLA IR No. 10112 entitled "Equivalent-Link Backward Propagation Method for Nonlinearity Compensation in Fiber Transmission Systems". [7] Fludger, C. R. S.; Duthel, T.; van den Borne, D.; Schulien, C.; Schmidt, E.-D.; Wuth, T.; Geyer, J.; De Man, E.; Khoe Giok-Djan; de Waardt, H.; , "Coherent Equalization and POL-MUX-RZ-DQPSK for Robust 100-GE Transmission," Lightwave Technology, Journal of, vol. 26, no. 1, pp. 64-72, Jan. 1, 2008. [8] E. F. Mateo, X. Zhou, and G. Li "Improved digital backward propagation for the compensation of inter-channel nonlinear effects in polarization-multiplexed WDM systems" Optics Express 19(2), pp. 570-583. [9] Seb J. Savory, "Digital filters for coherent optical receivers," Opt. Express 16, 804-817 (2008).

The capacity of optical fiber is ultimately limited by the Kerr nonlinearity, where refractive index changes with field intensity, causing localized phase shift proportional to power as the signal propagates. This nonlinear phase shift, which accumulates over distance, together with the action of fiber dispersion could severely distort the signal. Such distortion sets an upper limit for fiber capacity at a given transmission distance or alternatively, it limits the transmission distance for a given fiber capacity.

Two main approaches have been taken over the years for the nonlinearity compensation (NLC) in optical fiber transmission: Optical techniques and digital signal processing DSP techniques.

Optical Techniques: This approach is based on the generation optical phase conjugation. Optical phase conjugation can be used to compensate both fiber dispersion and fiber nonlinearity provided that the transmission link has certain symmetry properties. Typically, optical phase conjugation is implemented by using optical nonlinear processes such as wavelength conversion or Four-wave mixing [1]. Recently, a method to generate optical phase conjugation in the opto-electronic domain was proposed [2].

DSP Techniques: With the advent of coherent detection technologies, the compensation of fiber impairments such as, chromatic dispersion, polarization mode dispersion or fiber nonlinearity, could be now implemented in the digital domain by means of Digital Signal Processing (DSP) methods. Many different methods have been proposed to compensate fiber nonlinearity using DSP techniques. Amongst them, Digital Back-propagation (DBP) has been widely studied and tested in many different transmission links [3]. Although effective, DBP is extremely resource hungry for the current DSP platforms. As a consequence, significant efforts have been made to simplify the DBP algorithms. Some examples of that are the ones published in [4] for dispersion unmanaged links and [5, 6] for dispersion managed links. However, the DSP complexity is still very large and further simplifications have to be made for practical implementation of nonlinear compensation algorithms. This is the main purpose of the invention.

Accordingly, there is a need for a solution to compensate nonlinear effects in fiber that can increase fiber capacity and/or transmission distance beyond their limits.

BRIEF SUMMARY OF THE INVENTION

In an aspect of the present invention, an optical communication system includes a transmitter; an optical link coupled to the transmitter; a coherent receiver coupled to the optical link for receiving a signal; and a digital signal processer coupled to the coherent receiver, said coherent receiver including a nonlinearity compensation module for compensating for nonlinear effects in fiber in the optical link for increasing capacity or transmission distance of the fiber, the nonlinearity compensation module includes a spectral slicing of the signal into bands, computing nonlinear interaction between the bands with parameters opposite to those of the fiber to reverse the non-linear effects in the fiber, and only certain nonlinear interactions between bands are considered thereby reducing complexity of the nonlinearity compensation.

In a similar aspect of the present invention, a method for an optical communication system includes transmitting a signal from a transmitter; coupling an optical link to the transmitter; coupling a coherent receiver to the optical link for receiving a signal; and employing a digital signal processing coupled to the coherent receiver for providing a nonlinearity compensation module for nonlinear effects in fiber in the optical link thereby increasing capacity or transmission distance of the fiber, the nonlinearity compensation including a spectral slicing of the signal into bands with a computing nonlinear interaction between the bands with parameters opposite to those of the fiber to reverse the non-linear effects in the fiber, and only certain nonlinear interactions between bands being considered thereby reducing complexity of the nonlinearity compensation.

These and other advantages of the invention will be apparent to those of ordinary skill in the art by reference to the following detailed description and the accompanying drawings.

DETAILED DESCRIPTION

The invention is directed to a technique that drastically reduces the number of stages and therefore, the power consumption of the DSP chip. Typically, DSP algorithms based on DBP require multiple algorithmic stages. In the classic DBP method, each stage involves two operations, namely: frequency-domain chromatic dispersion compensation (CDC) and time-domain nonlinearity de-rotation (NLdR). The number of required stages depends on the transmission length, dispersion map and channel optical power. In general, the number of stages is chosen to be a compromise between performance and complexity. However, a minimum number of stages are necessary to achieve some performance improvement. Because frequency-domain CDC typically involves fast Fourier transform pairs (FFT/IFFT), the algorithmic complexity of classic DBP is prohibitive. The present invention drastically reduces the number of stages.

Figure 1:
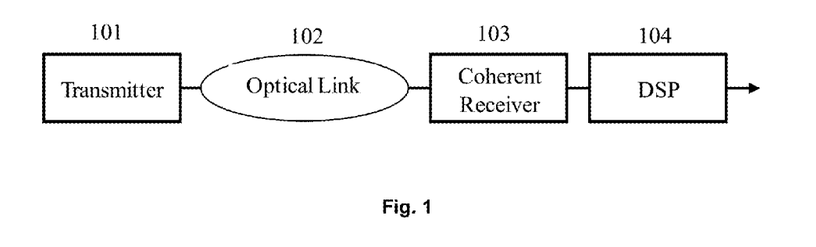
FIG. 1 is a diagram of a generic optical fiber communication system with coherent in which the invention can be employed.

FIG. 1 is shows a block diagram of a fiber communication system with coherent detection. The transmitter 101 communicates over an optical link 102 for reception by a coherent receiver 103 that outputs to a digital signal processing DSP module 104. In general, the transmitter could be any modulation format (QPSK, M-QAM, OFDM . . . ) including dual polarization.

Figure 2:
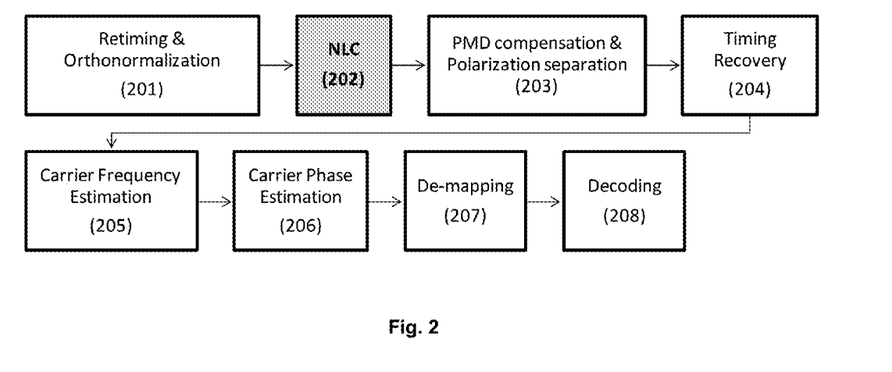
FIG. 2 is diagram of exemplary digital signal processing DSP stages of a digital coherent receiver in which the inventive nonlinearity compensation 202 is employed.

A conventional coherent receiver is considered for this invention [3,7]. After coherent detection, the signal is digitized and processed through digital signal processing DSP. FIG. 2 shows a typical flow for the coherent detection DSP stages. The nonlinearity compensation module 20 is the inventive stage. Responsive to a retiming and orthonormalization module 201, the NLC module outputs to a polarization mode detection compensation and polarization module 203, followed by a timing recovery module 204. The timing recovery module outputs to a carrier frequency estimation module 205 that is coupled to a carrier phase estimation module, a de-mapping module 207 and a decoding module 208.

The NLC 202 inventive stage includes a technique based on a spectral slicing of the signal. After slicing, the nonlinear interaction between bands is computed. When such interaction is calculated with parameters opposite to the fiber ones, the nonlinear effects can be reversed. The key of the NLC based invention is that only certain nonlinear interactions between bands are considered, which can simplify the procedural complexity.

Physical and Mathematical Background

After coherent detection, and optical signal is digitized and re-sampled. The time domain signals can be expressed as $\bar{X}(t)$ and $\bar{Y}(t)$ for x and y polarizations respectively. $\bar{X}(t)$ and $\bar{Y}(t)$ can be transformed into multiple bands by sharp filtering in the frequency domain. Such decomposition into N bands can be expressed as, $$\bar{X}(t) = \sum_{k=1}^{N} X_k(t) e^{ik\Omega_k t}$$

and $$\bar{Y}(t) = \sum_{k=1}^{N} Y_k(t) e^{ik\Omega_k t}$$

where $\Omega_k$ is the center frequency of each band.

Figure 3:
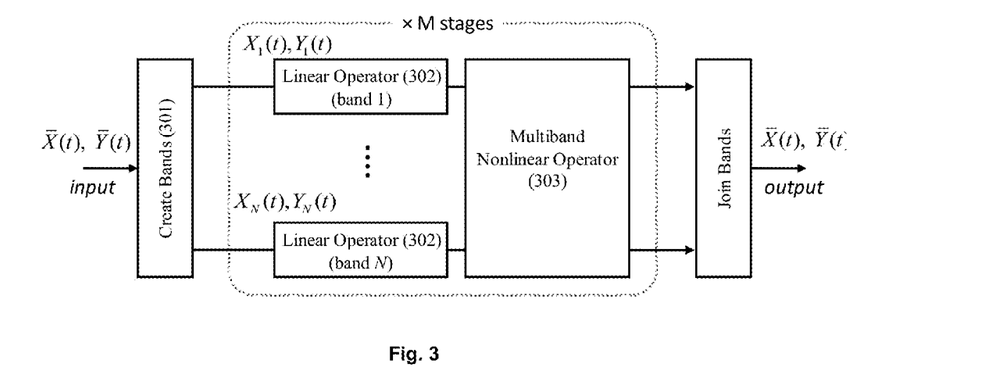
FIG. 3 is a diagram of a multi-stage implementation of inter-band nonlinearity compensation, in accordance with the invention.

By applying the XPM formalism for WDM channels [8], the nonlinear interaction between bands can be described by the following set of coupled equations, $$-\frac{\partial X_k}{\partial z} + \left(\frac{\alpha}{2} + L_{CD} + iC_{xk}\right)X_k + iQ_k Y_k = 0, \quad (1)$$

$$-\frac{\partial Y_k}{\partial z} + \left(\frac{\alpha}{2} + L_{CD} + iC_{yk}\right)Y_k + iQ_k^* X_k = 0,$$

Where $c_{(x,y)k}$ and $Q_k$ represent the intra-channel XPM (iXPM) contribution and intra-channel polarization mixing (iPolM) term, respectively, i.e:

$$C_{(x,y)k} = -\gamma\left(|X_k|^2 + |Y_k|^2 + \sum_{m \neq k} R_{(x,y)m}\right) \quad (2)$$

$$Q_k = -\gamma\left(\sum_{m \neq k} X_m^* Y_m\right), \quad (3)$$

where, and $R_{(x)k}=2|X_k|^2+|Y_k|^2$ and $R_{(y)k}=2|Y_k|^2+|X_k|^2$. The first two terms on the right hand side of Eq. (2) represent the intra-band nonlinearity whereas $R_{(x,y)m}$ includes the inter-band contribution. The operator $L_{CD}$ represents the chromatic dispersion of the fiber and depends on the dispersion map. Therefore, in general, the CD operators are time and distance dependent, i.e. $L_{CD}(t, z)$. The parameter $\gamma$ is the effective nonlinear parameter and its value is obtained through optimization. Equations (1) are a set of partial differential equations that have no analytical solution. Typically, Eqs. (1) are solved using the split-step method. This method uses several stages in which the system can be uncoupled into its linear and nonlinear parts. This is the typical multi-stage implementation for back-propagation. FIG. 3 shows an schematic of the multi-stage solution of Eqs. (1).

First, the signal is sliced into bands in the frequency domain to perform the operations, $$\overline{X}(t) = \sum_{k=1}^{N} X_k(t) e^{ik\Omega_k t}$$

and $$\overline{Y}(t) = \sum_{k=1}^{N} Y_k(t) e^{ik\Omega_k t}$$

Module 301 performs such operation in the frequency domain, where digital filters are used to cut the original spectrum create the bands. Then, the linear operator (302) performs CD compensation to each band. CD compensation can be performed either in the frequency domain using a FFT/IFFT pair or in time domain using FIR filters [9]. Both operations can be combined using look-up-table (LUT) methods in order to simplify the DSP (see [10]). The amount of dispersion to be compensated at each stage depends on the transmission link and the number of stages. In dispersion unmanaged links, the amount of CDC per stage is the total CD of the link divided by the number of stages [3]. In dispersion managed links, the amount of CDC per stage is the residual CD of the link divided by the number of stages [5,6]. In order to obtain the nonlinear operator (303), Eqs. (1) have to be solved for $L_{CD}=0$. We have used a perturbation approach together with an dispersive walk-off factorization approach [8]. Finally, the nonlinear operators can be expressed as:

$$X_k^{out}(t) = X_k^{in}(t) e^{i\phi_{xk}(t)} - iY_k^{in}(t) e^{i\phi_{ym}(t)} \delta_k(t)$$

$$Y_k^{out}(t) = Y_k^{in}(t) e^{i\phi_{yk}(t)} - iX_k^{in}(t) e^{i\phi_{xm}(t)} \delta_k^*(t) \quad (4)$$

Where the functions $\phi_{(x,y)k}(t)$ and $\delta_k(t)$ are given by, $$\phi_{xk}(t) = |X_k|^2 \otimes h_{kk}(t) + \sum_{m \neq k}^{N} (2|X_m(t)|^2 + |Y_m(t)|^2) \otimes h_{km}(t) \quad (5)$$

$$\phi_{yk}(t) = |Y_k|^2 \otimes h_{kk}(t) + \sum_{m \neq k}^{N} (2|Y_m(t)|^2 + |X_m(t)|^2) \otimes h_{km}(t)$$

$$\theta_k(t) = \sum_{m \neq k}^{N} (X_m(t) Y_m^*(t)) \otimes h_{km}(t)$$

The functions $h_{km}(t)$ are the impulse response of the filters $H_{km}(\omega)$. Filters $H_{km}(\omega)$ account for the dispersive walk-off effect. The filters $H_{km}(\omega)$ are given by the following expression, $$H_{km}(\omega) = \gamma \frac{e^{-id_{km}\omega L/M} - 1}{\alpha - id_{km}\omega}. \quad (6)$$

where $d_{km}=\beta_2(\omega_k-\omega_m)$ is the walk-off parameter. The parameter $\beta_2$ is the chromatic dispersion constant of the fiber and L is the transmission distance. For dispersion managed links, $\beta_2$ is replaced by $\overline{\beta}_2$ which is the dispersion parameter of the equivalent link [5,6]. Following are diagrams for the operations inside the module 303.

Figure 4:
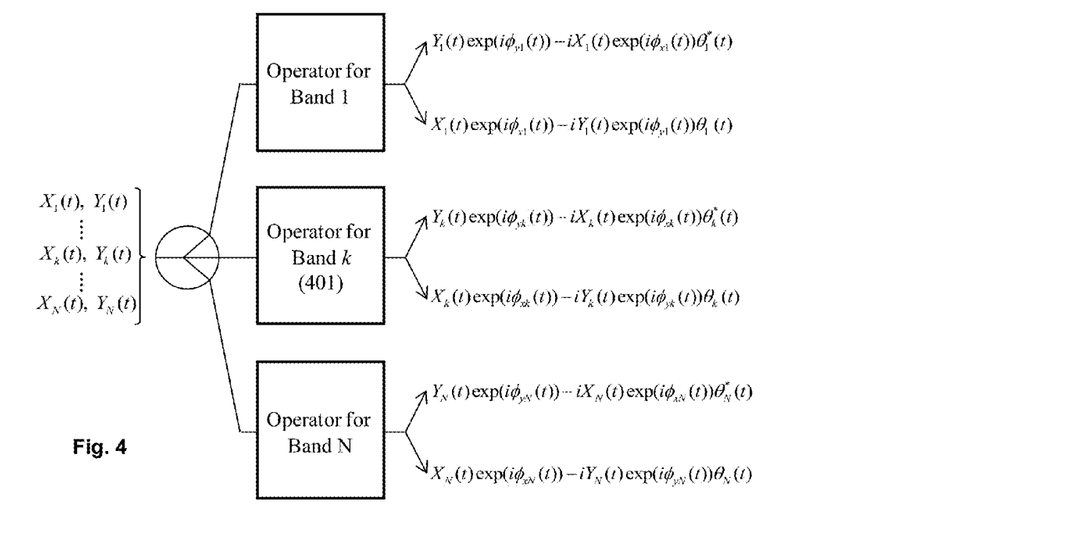
FIG. 4 is a diagram of the multi-band nonlinear operator 303 shown in FIG. 3.
Figure 5:
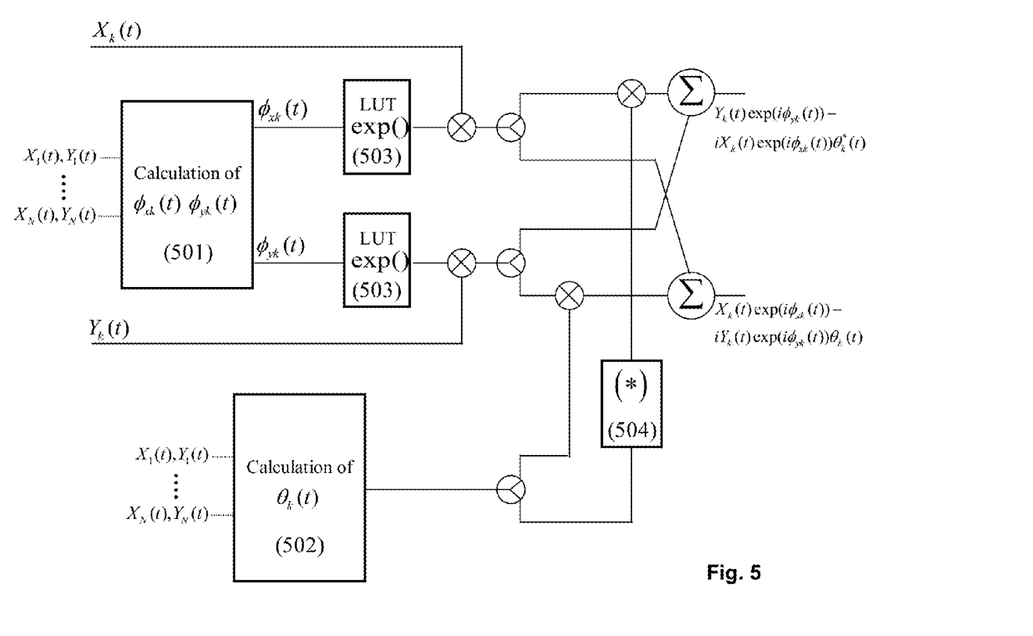
FIG. 5 is a diagram of the module 401 operator for the band k shown in FIG. 4.
Figure 6:
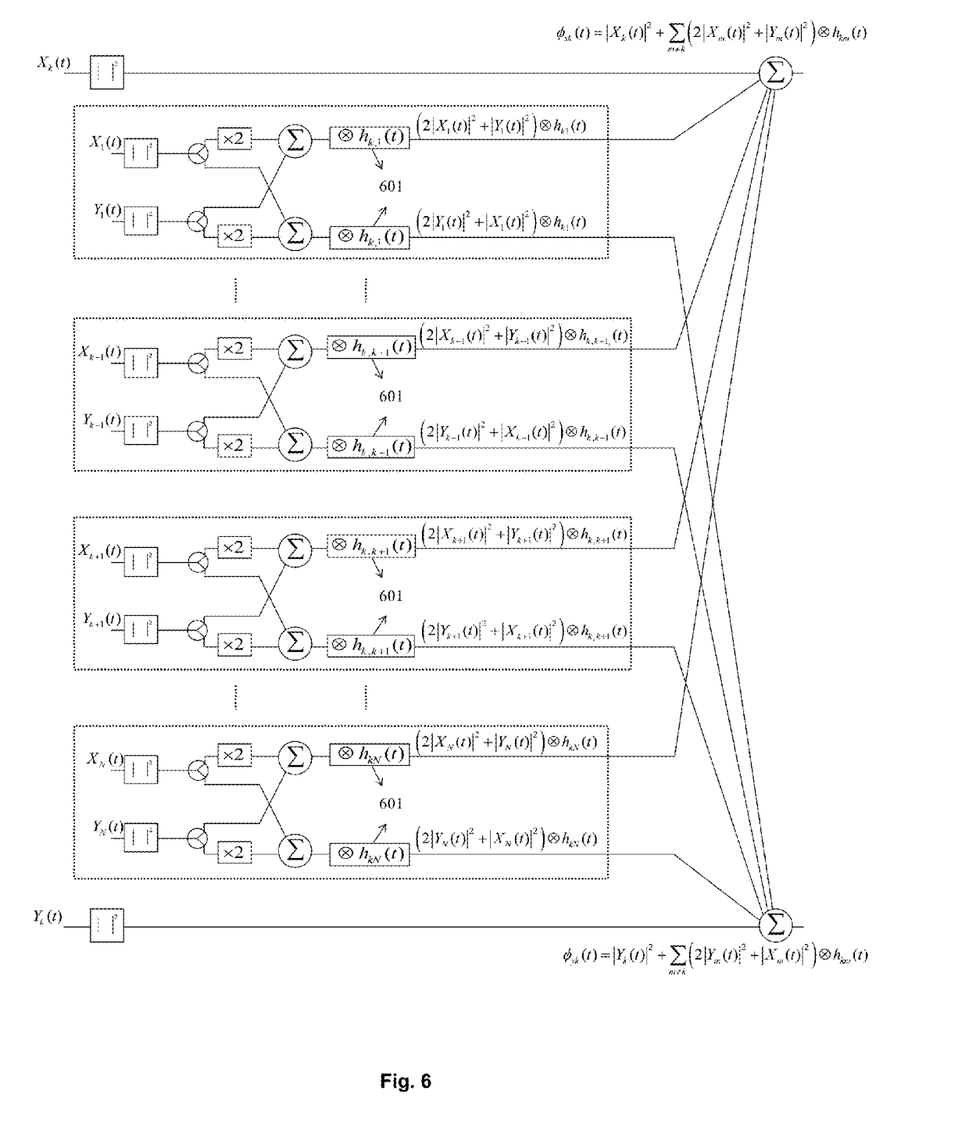
FIG. 6 is a diagram of the module 501, shown in FIG. 5, for calculation of $\phi_{xk}(t)$ and $\phi_{yk}(t)$.
Figure 7:
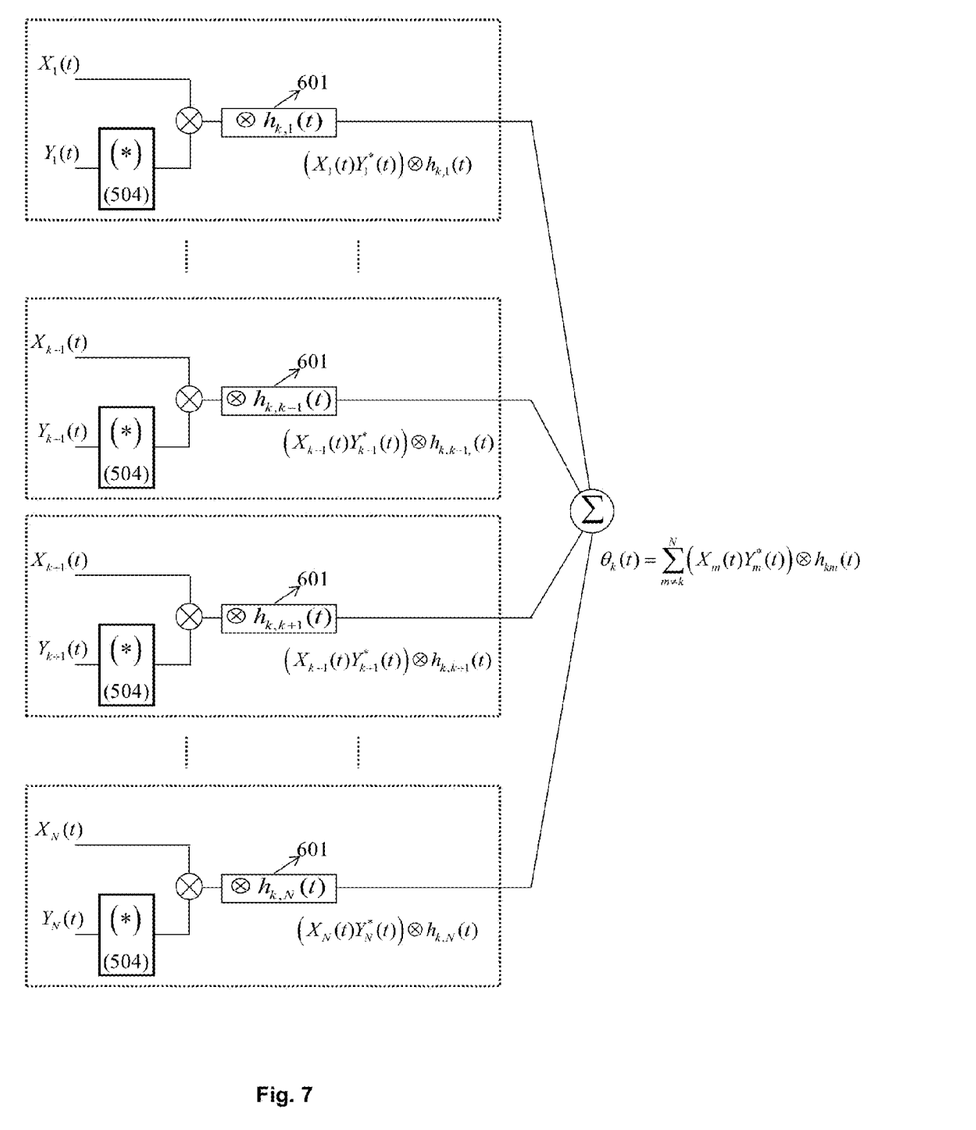
FIG. 7 is a diagram of module 502, shown in FIG. 5, for calculation of $\theta_k(t)$.

FIG. 4 shows the multiband operator 303. The operator comprises block for each of the bands. FIG. 5 show the operator for band k, 401. In FIG. 5, the module 501 calculates the phase shifts $\phi_{(x,y)k}$ whereas the module 402 carries out the calculation of the function $\theta_k$. Details of 502 and 503 are shown in FIGS. 6 and 7 respectively. Module 503 performs an exponential operation using look-up table (LUT). Module 504 carries out phase conjugation.

FIG. 6 show the block diagram for the operator 501. The module 601 performs the convolution between $|X_k(t)|^2$, $|Y_k(t)|^2$, with the impulse responses, $h_{km}(t)$. Convolution can be performed using FIR filters in time domain or FFT/IFFT pair in frequency domain. The coefficients of the filters $h_{km}(t)$ are obtained by performing inverse Fourier (IFFT) transform of the filters, $H_{km}(\omega)$ which depend on the chromatic dispersion of the link through the walk-off parameters $d_{km}$. The values of the filters are static and can be stored in a memory location so they cannot be calculated every time.

Example of Application and Experimental Results

Figure 8:
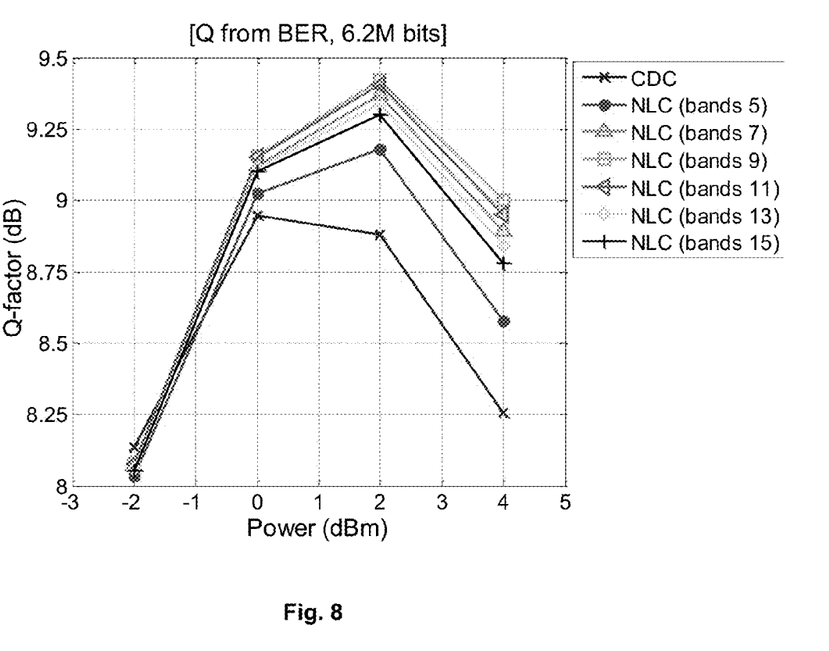
FIG. 8 is a diagram showing application and experimental results of application of the invention to experimental data obtained from fiber transmission over 3400 km of dispersion managed link.

As an example of application, FIG. 8 shows results from the application of this invention to experimental data obtained from fiber transmission over 3400 km of dispersion managed link. Results are shown for M=1 stages, showing that an improvement of 0.5 dB can be obtained with only one stage. This is the maximum improvement obtained from a single-stage algorithm to our knowledge.

As FIG. 8 shows, there are an optimum number of bands for best performance in a single-stage operation. The reason is that for large number of bands, the FWM between bands have to be considered for better performance. This significantly increases the algorithm complexity and it is not included in this invention. For a small number of bands, performance becomes limited by the chromatic dispersion. The optimum number of bands depends on the link characteristics and the trade-off between performance and complexity.

The invention may be implemented in hardware, firmware or software, or a combination of the three. Where parts of the invention are implemented in a computer program, they may be executed on a programmable computer having a processor, a data storage system, volatile and non-volatile memory and/or storage elements, at least one input device and at least one output device.

Figure 9:
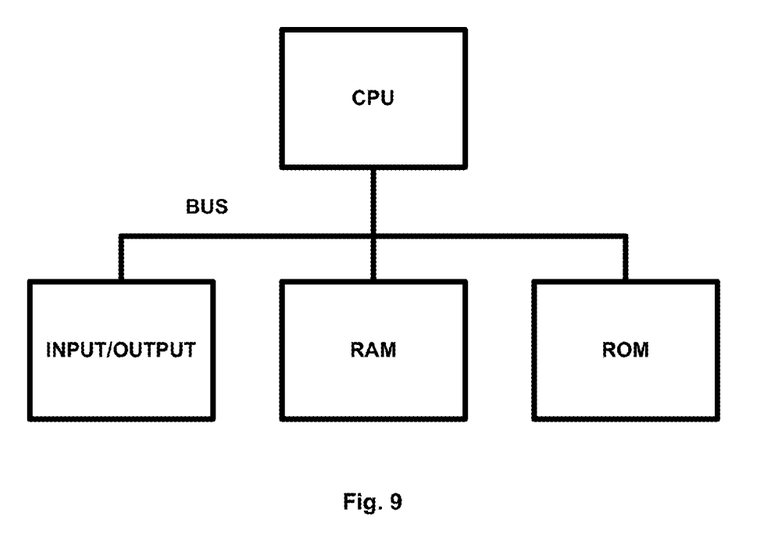
FIG. 9 is a diagram showing an exemplary computer to perform the inventive nonlinearity compensation, in accordance with the invention.

By way of example, a block diagram of a computer to support the system is discussed next in FIG. 9. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in one of or combination of analog or digital form over one or a number of communication links such as a serial link, local area network, wireless link, optical link and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can also be appreciated that the invention, unlike previous solutions, provides significant competitive/commercial value. Nonlinearity compensation is a fundamental aspect in future transceivers based on coherent detection and it has been identified as a key technology by the fiber communications community. However, the difficulties in terms of complexity have been preventing its implementation in real products. This invention significantly simplifies the complexity of DSP-based NLC by giving up some performance. By implementing a NLC method in the current product, a significant commercial advantage can be obtained with respect to competitors.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional details are provided in the accompanying "Appendix to Specification". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An optical communication system comprising:
   a transmitter;
   an optical link coupled to the transmitter;
   a coherent receiver coupled to the optical link for receiving a signal; and
   a digital signal processor coupled to the coherent receiver, including a nonlinearity compensation module for compensating for nonlinear effects in fiber in the optical link for increasing capacity or transmission distance of the fiber, the nonlinearity compensation module includes a spectral slicing of the signal into bands, computing nonlinear interaction between the bands with intra-channel and intra-band parameters opposite to those of the fiber to reverse the non-linear effects in the fiber, and only certain nonlinear interactions between bands are considered thereby reducing complexity of nonlinearity compensation.

2. The system of claim 1, wherein the digital signal processor comprises digitizing and re-sampling the signal to provide time domain signals expressed as $\overline{X}(t)$ and $\overline{Y}(t)$ for x and y polarizations respectively with $\overline{X}(t)$ and $\overline{Y}(t)$ being transformed into multiple bands by sharp filtering in a frequency domain.

3. The system of claim 1, wherein digital filters are used to cut an original spectrum of the signal to create the bands and then a linear operator performs chromatic dispersion CD compensation to each band, the CD compensation being performable in either in a frequency domain using a transform pair in the frequency domain or using FIR filters in time domain.

4. The system of claim 1, wherein the nonlinearity compensation comprises performing a convolution between nonlinearity bands with impulse responses, the convolution can be performed using finite impulse response filters FIR in a time domain, coefficients of the impulse response filters being obtained by performing inverse fast Fourier (IFFT) transform of the impulse response filters which depend on a chromatic dispersion of the optical link through walk-off parameters, and values of the filters are static and can be stored in a memory location so they do not have to be calculated every time.

5. The system of claim 1, wherein the nonlinearity compensation comprises the signal being sliced into bands in a frequency domain where digital filters are used to cut an original spectrum create the bands, then a linear operator performs chromatic dispersion CD compensation to each band, the CD compensation being performable in a frequency domain using a fast Fourier transform and inverse fast fourier transform FFT/IFFT pair or in a time domain using finite impulse response FIR filters.

6. The system of claim 1, wherein the amount of dispersion to be compensated depends on an optical link and a number of stages, in dispersion unmanaged links, an amount of chromatic dispersion compensation CDC per stage being a total CD of the optical link divided by the number of stages and in dispersion managed links, the amount of CDC per stage is a residual CD of a link divided by the number of stages.

7. A method for an optical communication system comprising the steps of:
   transmitting a signal from a transmitter;
   coupling an optical link to the transmitter;
   coupling a coherent receiver to the optical link for receiving a signal; and
   employing a digital signal processing coupled to the coherent receiver for providing a nonlinearity compensation module for nonlinear effects in fiber in the optical link thereby increasing capacity or transmission distance of the fiber, a nonlinearity compensation including a spectral slicing of the signal into bands by computing nonlinear interaction between the bands with intra-channel and intra-band parameters opposite to those of the fiber to reverse the non-linear effects in the fiber, and only certain nonlinear interactions between bands being considered thereby reducing complexity of nonlinearity compensation.

8. The method of claim 7, wherein the digital signal processing comprises digitizing and re-sampling the signal to provide time domain signals expressed as $\overline{X}(t)$ and $\overline{Y}(t)$ for x and y polarizations respectively with $\overline{X}(t)$ and $\overline{Y}(t)$ being transformed into multiple bands by sharp filtering in a frequency domain.

9. The method of claim 7, wherein the digital signal processing comprises employing digital filters for cutting an original spectrum of the signal to create the bands and then performing with a linear operator chromatic dispersion CD compensation to each band, the CD compensation being performable in either in a frequency domain using a transform pair in the frequency domain or using FIR filters in time domain.

10. The method of claim 7, wherein the nonlinearity compensation comprises performing a convolution between nonlinearity bands with impulse responses, the convolution being performable using finite impulse response filters FIR in a time domain, coefficients of the impulse response filters being obtained by performing an inverse fast Fourier (IFFT) transform of the impulse response filters which depend on a chromatic dispersion of the optical link through walk-off parameters, values of the filters being static and storable in a memory location so they do not have to be calculated every time.

11. The method of claim 7, wherein the nonlinearity compensation comprises the slicing the signal into bands in a frequency domain where digital filters are used to cut an original spectrum create the bands, then a linear operator performing chromatic dispersion CD compensation to each band, the CD compensation being performable in a frequency domain using a fast Fourier transform and inverse fast fourier transform FFT/IFFT pair or in a time domain using finite impulse response FIR filters.

12. The method of claim 7, wherein an amount of dispersion to be compensated depends on the optical link and a number of stages, wherein in dispersion unmanaged links the amount of chromatic dispersion compensation CDC per stage being a total CD of the optical link divided by the number of stages and in dispersion managed links an amount of CDC per stage being a residual CD of a link divided by the number of stages.

\* \* \* \* \*